5 Sheets—Sheet 1

G. F. McCOMBS.
Broom Sewing-Machine.

No. 208,407. Patented Sept. 24, 1878.

Witnesses:
R. C. Wrenshall
J. K. Smith

Inventor:
George F. McCombs
by Bakewell & Kerr
Attys

G. F. McCOMBS.
Broom Sewing-Machine.

No. 208,407. Patented Sept. 24, 1878.

Witnesses
Inventor
George F. McCombs
By Bakewell & Kerr
Attys

5 Sheets—Sheet 3.

G. F. McCOMBS.
Broom Sewing-Machine.

No. 208,407. Patented Sept. 24, 1878.

Witnesses
R. C. W. Fanshall
J. K. Smith

Inventor
George F. McCombs
by Bakewell & Kerr
attys

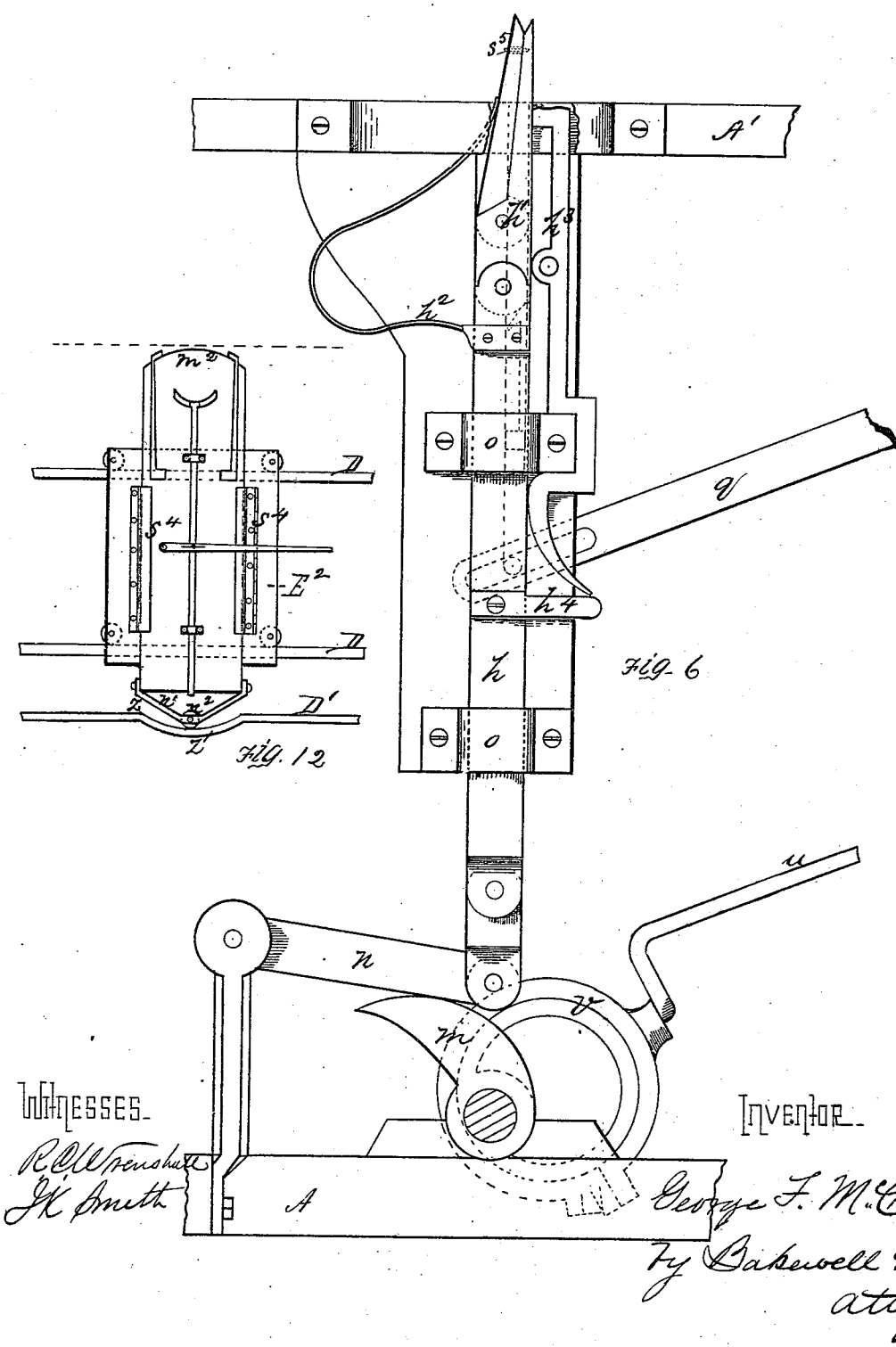

G. F. McCOMBS.
Broom Sewing-Machine.
No. 208,407. Patented Sept. 24, 1878.
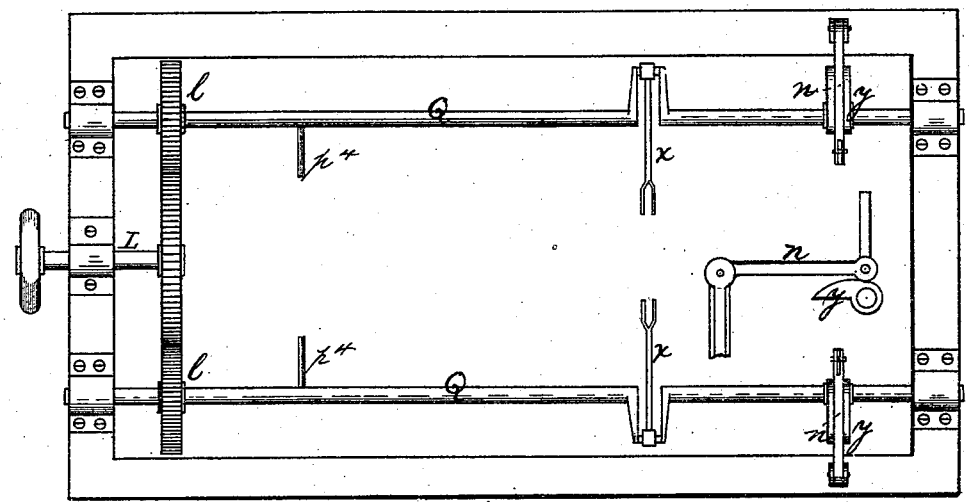
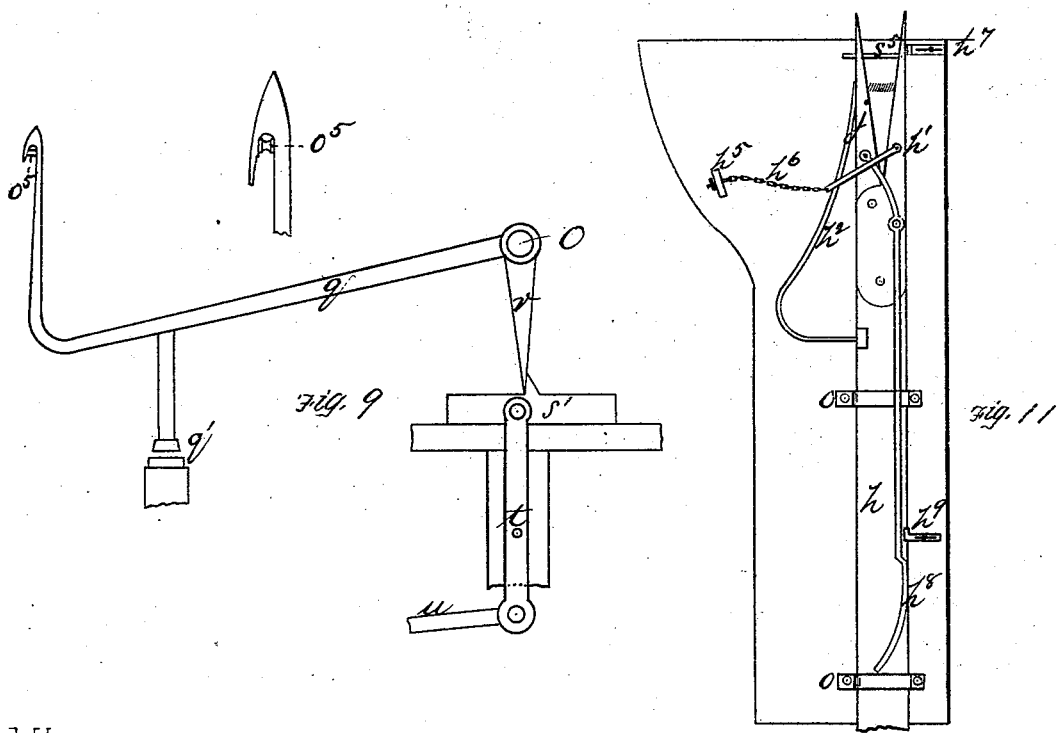

UNITED STATES PATENT OFFICE.

GEORGE F. McCOMBS, OF WASHINGTON, PENNSYLVANIA, ASSIGNOR TO ANNIE McCOMBS, OF SAME PLACE.

IMPROVEMENT IN BROOM-SEWING MACHINES.

Specification forming part of Letters Patent No. 208,407, dated September 24, 1878; application filed May 13, 1878.

*To all whom it may concern:*

Be it known that I, GEORGE F. McCOMBS, of Washington, in the county of Washington and State of Pennsylvania, have invented a new and useful Improvement in Machinery for Sewing Brooms and like articles; and I do hereby declare the following to be a full, clear, and exact description thereof, reference being had to the accompanying drawing, forming part of this specification, in which—

Figure 1:
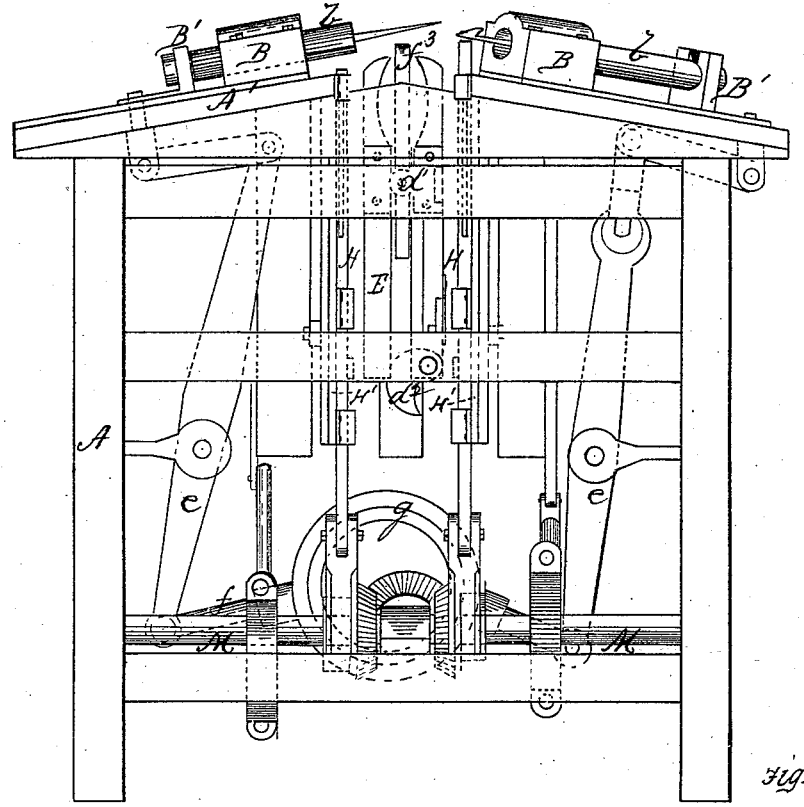
Figure 7:
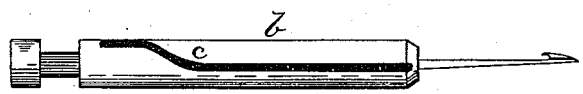
Figure 8:
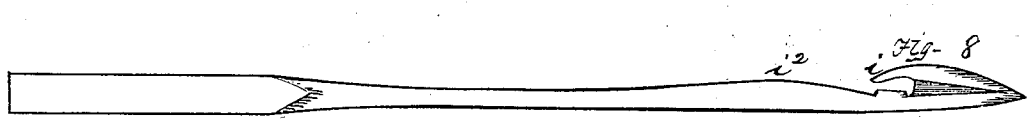
Figure 2:
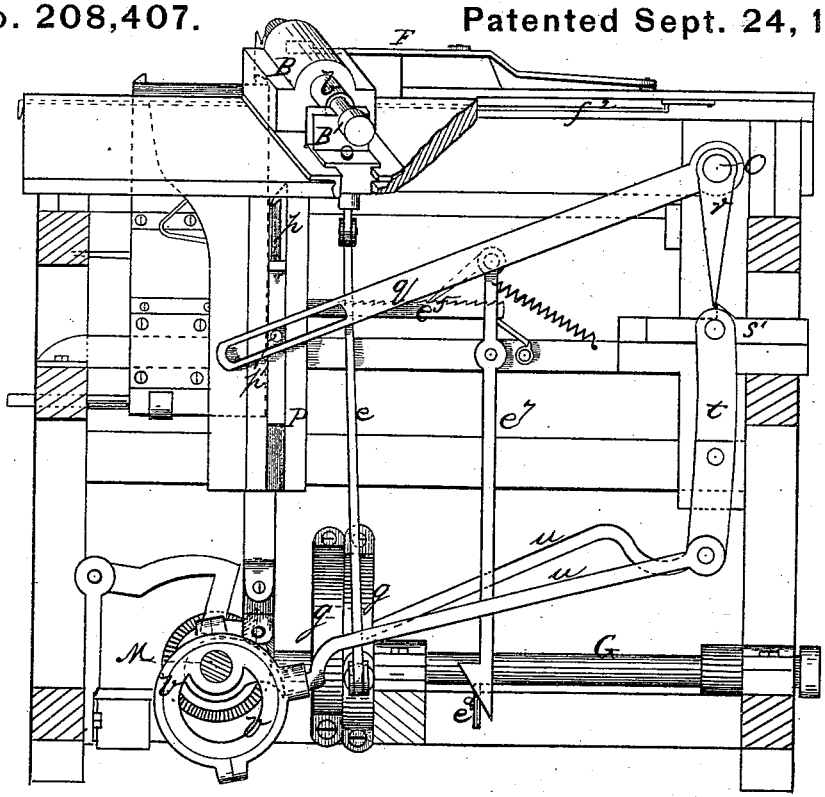
Figure 3:
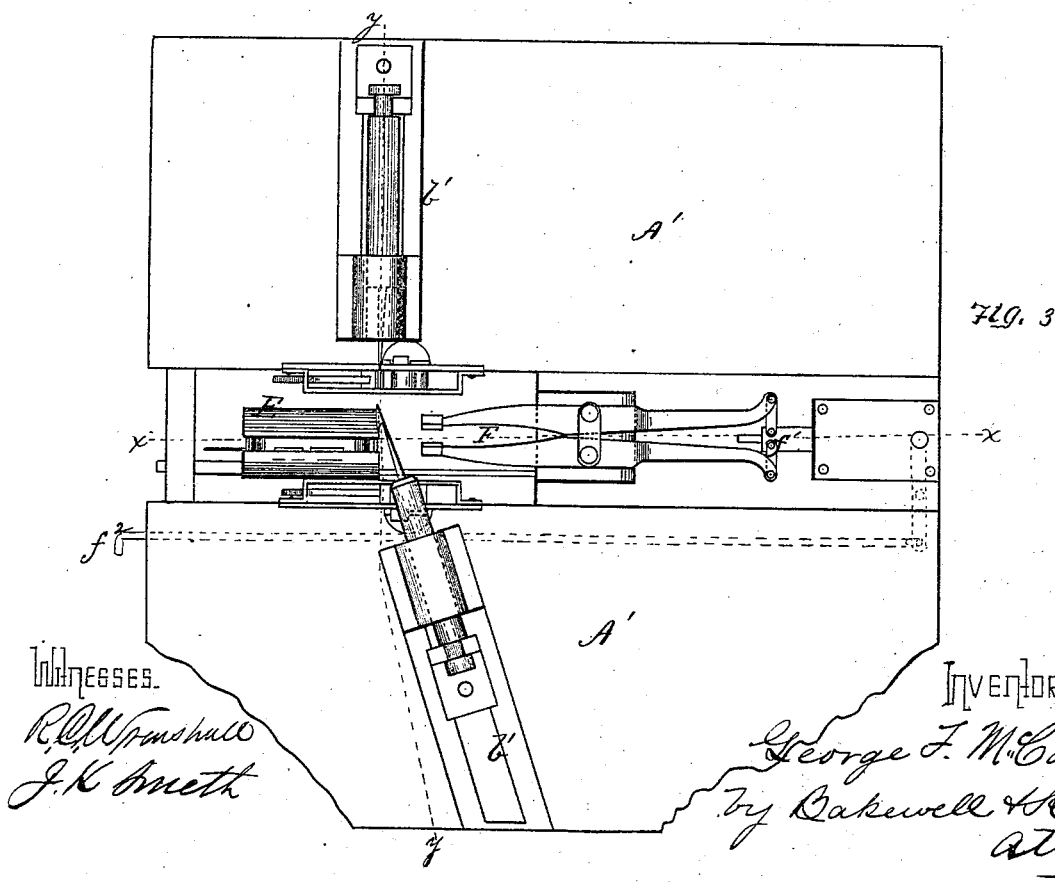
Figure 4:
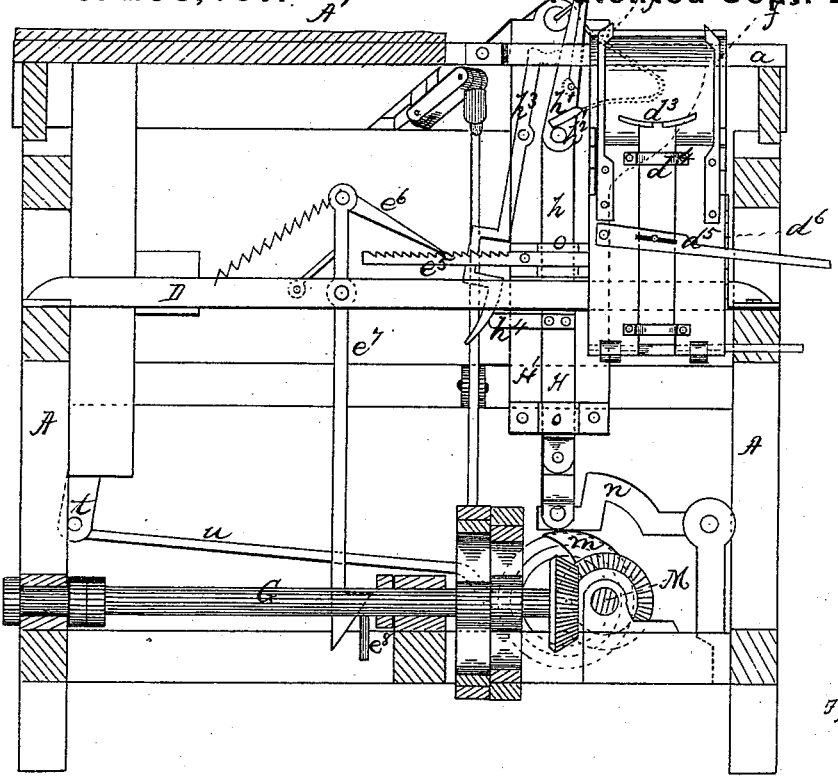
Figure 5:
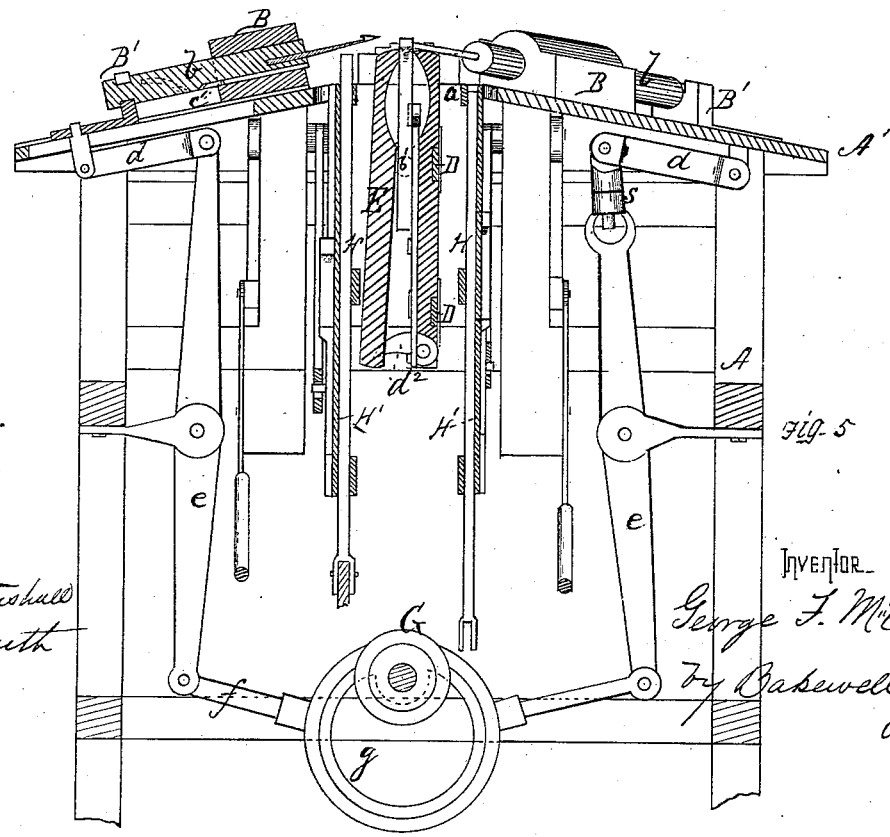

Figure 1 is a front elevation of a machine embodying my invention. Fig. 2 is a side elevation, portion of the frame being broken away. Fig. 3 is a top-plan view. Fig. 4 is a longitudinal vertical section on the line $x\ x$, Fig. 3. Fig. 5 is a transverse vertical section on the line $y\ y$, Fig. 3. Figs. 6, 7, and 8 are detailed views. Fig. 9 is a modification of the slack-carriers. Fig. 10 is a modification of the driving mechanism. Fig. 11 illustrates a modification of the tension mechanism. Fig. 12 illustrates a modified arrangement of vise for sewing curved seams.

Like letters of reference refer to like parts wherever they occur.

My invention relates to the construction and operation of machines for sewing brooms.

The present invention has for its object the production of a simple, durable, and effective machine for sewing brooms and like articles, said machine being adapted to sew with a single thread continuous with the binder, to make a stitch substantially that of the hand-sewed broom, and to work rapidly and uniformly with the expenditure of little power.

I will now proceed to describe my invention, so that others skilled in the art to which it appertains may apply the same.

In the drawing, A indicates a suitable frame, of metal or wood, as preferred, provided with cross-bars for the support and attachment of the operative mechanism, and a bed, A′, for the support of the needle bolts or arms. The bed A′ is inclined or sloped from the center to the sides at such an angle as will give the proper pitch to the needles to cause them to pass under and over the binder when in operation, and the center of bed A′ is cut away or slotted, as at $a$, for the vise or clamp which holds the broom or like article during the sewing.

Arranged on the bed A′, on the opposite sides of slot $a$, are two needle-bolts or carriers, $b$, which slide in cases or keepers B, and are controlled by slides B′, which move in ways $b'$, secured to or formed on bed A′. These bolts $b$, together with their cases, may be made adjustable, and are set according to the stitch desired. For instance, as shown in the drawing, where an N-stitch is preferred, one needle-bolt is set at right angles to the slot $a$, or vise therein, while the other is set off the right angle at an angle of seventy or eighty degrees, more or less, according to the width or space between the stitches; but where a W-stitch is desired the needle-bolts would both be set at the same angle off of the right angle, say, seventy or eighty degrees, dependent, as before specified, on the required distance between the stitches.

The needle employed is shown enlarged in Fig. 8, and is usually from eight to ten inches long, more or less, according to circumstances. Its general form is similar to a crochet-needle; but, in order to prevent the hook from becoming entangled while being withdrawn from the broom, the barb is tapered from just back of the point, so as to form a swell on the barb, as at $i^3$, is curved in somewhat, as at $i$, and is guarded by a swell or enlargement, $i^2$, just back of the barb.

In order to rotate the needle a quarter-turn, more or less, to insure its engaging with the thread, a slot or cam-groove, $c$, is formed in bolt $b$, and a pin, $c'$, is inserted in the case B. To the needle-bolts $b$ alternate reciprocating motion is imparted by eccentrics $g$ on the main power-shaft G, through pitman $f$, pivoted levers $e$, and links $d$, though other well-known mechanism may be adopted for that purpose, and in some instances will be preferred, as will appear hereinafter in the description of the modified driving mechanism shown in Fig. 10. Where one or both of the needle-bolts are set at an angle other than a right angle, a swivel-joint, $s$, should be used between the lever $e$ and link $d$, to allow for the change of direction.

On frame A, below the slot $a$ in bed A′, and extending longitudinally of the frame, are bars D, which form rests and ways for the support and travel of the vise E.

E represents a vise suspended in the slot $a$ between the needle-bolts. This vise is formed by two jaws, pivoted as at $d^1$, one of said jaws adapted to rest and slide upon the ways D; and the two jaws are set to clamp a broom or like article placed between them, by means of one or more cams, $d^2$, pivoted on either one of said jaws.

Within the vise, and attached to one of the jaws thereof, is a movable concave rest, $d^3$, adapted to slide in staples $d^4$, and adjustable up or down by means of a pivoted lever, $d^5$, provided with a locking-ratchet, $d^6$. By these devices the position of the broom within the vise can be graduated, regulated, and changed according to the number and distance apart of the seams it is desired to form therein.

To the vise E is attached a notched bar or rack, $e^5$, on which plays the pawl or dog $e^6$ of lever $e^7$, the latter pivoted to one of the cross-bars D, or some suitable portion of frame A, and vibrated by a cam or pin, $e^8$, on the main power-shaft, so as to cause the vise to travel with intermittent movement along the slot and between the needle-bolts.

Secured centrally on bed A′, and in line with the slot $a$ and travel of the vise E, is a spring-clamp, F, which may be operated by a toggle-joint, $f^1$, and rod $f^2$, or equivalent mechanism. This clamp is adapted to embrace the sides of the broom loosely at a point above the vise E and just below the binder, so as to prevent the slipping of the binder on the sides; and in order to prevent it from sagging at the ends a set of spring-arms, $f^3$, are employed and may be secured to either of the jaws of the vise E.

In connection with the needles are employed tension devices H, secured and adapted to slide on guides H′, arranged on each side of slot $a$ and in line with the needle. These devices, which serve not only to seize the thread and preserve its tension, but to assist the engagement of the thread with the opposite needle, have a lateral motion, or motion in the arc of a circle, as well as a reciprocatory motion, and are constructed as follows: On one end of a bar or rod, $h$, which is arranged to slide in guides $o$, is pivoted a pair of nippers, $h^1$, one jaw of which is controlled by a spring, $h^2$, while the other works against a bent lever, $h^3$, pivoted on the ways H′. Secured to one jaw of the nippers, and passing through a hole in the opposite jaw at a point just below the extremities, is a pin, $s^5$, which prevents the thread from slipping down too far in the tension device.

On the lower end of sliding bar or rod $h$ is secured a cam-lug, $h^4$, which, when the bar has traveled a certain and determinate distance, projecting the nippers $h^1$ vertically, strikes the end of bent pivoted lever $h,^3$ so as to deflect its opposite end and cause the nippers to rotate on its pivot or move in the arc of a circle, thus carrying the thread laterally across the path of the needle. As soon as the needle has engaged or secured the thread the cam $m$ permits the tension mechanism to fall and the slide-bar recedes, and the operations specified are reversed. Motion is imparted alternately to each of said tension devices by means of cams $m$ $m$, arranged on transverse shafts M M, driven by bevel or other suitable gearing from the main shaft G, said cams $m$ $m$ working upon bars or rods $h$ through intermediate links $n$ $n$, pivoted on the main frame A′.

In connection with each needle and tension mechanism before described, I employ a device for pulling the slack thread through the broom and out of the way, and such device or devices I term "slack-carriers." Said devices are usually placed on each side of slot $a$, back of the tension mechanism, and between it and the corresponding needle-bolt, and are preferably composed of a hooked bar, $p$, adapted to slide in ways P, usually on the reverse side of the pendant whereon are the ways of the tension mechanism.

The sliding rod $p$ is provided with a pin or lug, $p^1$, on which works a slotted arm or lever, $q$, whose opposite end is fastened to a short shaft, O, journaled on main frame A′. Adjustably connected to said short shafts O are cam-arms $r$, which are actuated to rock shafts O by cam-slides $s^1$, moved by pivoted levers $t$ and pitman $u$ from eccentrics $v$ on shaft M—one series for each slack-carrier; and said mechanism is arranged to operate the carriers alternately, as before specified, for the needle-bolts.

The mechanism for operating the needles, tension devices, slack-carriers, and for causing the travel of the vise being such as described, or a mechanical equivalent therefor, the cams, eccentrics, and cranks of the several series are arranged with relation to each other so as to cause the tension device of each needle to rise vertically in the track of the corresponding needle immediately on the withdrawal of said needle from the broom, to seize the thread between the needle and the broom, and then, by a compass-movement, or movement in the arc of a circle, carry said thread across the opposite needle on its back movement, to insure the thread-engagement therewith.

The mechanism of the slack-carrier causes the same to advance at the same time as the tension mechanism to pass between the looped thread, so that, in dropping back to its original position when released by its cam, the hook takes over the slack thread and whips it out of the way.

The mechanism for feeding the vise is so arranged that the vise is advanced the required distance for the next stitch at the instant both needles are free from the broom, and when the N-stitch is made and the needles are set, as shown in the drawing, it should be just before the advance of the needle, which is set at right angles to the broom, or during the retreat of the other needle. Where both needles are set at an angle off of a right angle, to make the W-stitch, it may be before or during the action of either needle, as preferred.

In sewing a seam, the broom is placed in the vise with its shoulder resting in the curved rest $d^3$, which has been previously adjusted to bring the broom opposite the needles at the desired point for forming a seam. A thread, the required length for both binding and sewing, is then wrapped one or more times around the broom to form the binder, and the free end passed through the broom by a hand-needle, as in forming the first stitch by hand-sewing. Where the needles are set at different angles, as shown in Fig. 3, we prefer to commence the sewing with the needle set at right angles to the broom, or the one that makes the straight stitch, and shall in this description of the operation of the machine term the same the "first needle." The thread is drawn taut, and either held or inserted in the tension device. The machine is then started, and the first needle, advancing from the opposite side of the broom, passes through the same, enters below, and emerges above the binder, makes a quarter-rotation on the last part of its advance, takes the thread from the tension device and retires, making a reverse quarter-rotation, drawing the loop through the broom to the opposite side, where the tension device of that side, rising in line with the point of the needle, (as soon as it passes,) seizes the thread ready to deliver it to the following needle, while the slack-carrier, which has advanced at the same time as the tension device, enters the loop and with its hook seizes the slack, drawing it through the broom and out of the way, assisting, also, the first needle in relieving itself of the thread. The second needle, which enters angling and has followed the first needle, now emerges from the broom at the same point, but above the binder, receives the thread from the tension device, and draws it back to the side from which it started, (at a point below the binder,) where the tension devices and slack-carrier of that side act in like manner, as before specified. The cam on the power-shaft now operates the vise-feeding mechanism, and feeds forward the vise the distance required for the next stitch, whereupon the several operations are repeated, and the sewing is thus continued until the seam is finished. As soon as the seam is finished the lever is operated to elevate the rest and broom to the position for another binder. Said binder is placed on the broom, as before specified, the vise is pushed back to its first position, and the second seam sewed as was the first.

In Fig. 9 of the drawing is shown a modified form of slack-carrier—that is to say, the power mechanism (cam-slide $s'$, cam-arm $r$, and shaft $o$) is the same as in Fig. 2; but the ways P, hooked bar $p$, and pin $p^1$ are omitted, and the end of slotted arm or lever $q$ is bent and hooked, as a substitute therefor, and moves in the arc of a circle instead of reciprocating. With such a construction a spring or equivalent device, $q'$, should be used to arrest the fall of the slack-carrier and to relieve the jar of the machinery.

Where it is desirable to set the bed A' as low as possible, and to simplify and reduce the driving mechanism, the form shown in Fig. 10 may be adopted. In said figure, L is a short power-shaft, journaled in one end of frame A, and provided with a pinion, gearing with two smaller pinions, $l\ l$, on shafts Q, extending longitudinally of frame A. On shafts Q are cranks $x\ x$, and links, which operate levers $e$ to reciprocate the needle-bolts, and also cams $y\ y$ to operate the nippers or tension devices through links $n$, which latter should in such case be pivoted on the side bars of frame A. The slack-carriers can be operated by cam lugs or pins $p^4$ through pivoted levers, similar to that shown at $e^7$ for operating the feed-pawl of the vise E. Such a construction will leave the center of the frame A comparatively free of mechanism, and permit the frame to be set as low as desired, limited only by the length of the broom-handle.

In Fig. 11 I have shown a modified form of tension devices, having all the functions and motions of those shown in Fig. 6, viz., the reciprocating, to seize the thread, and the vibrating or compass motion, to carry the thread across the needle, and, in addition thereto, two other functions, first, a positive motion, to separate the threads forming the loop, and, secondly, a positive griping or nipping motion, to catch the thread. Said devices are constructed as follows: The bar or rod $h$, sliding in guides $o$, is provided with nippers, one jaw of which, $h^1$, is pivoted to the bar $h$, and the other jaw, $j$, is pivoted to $h^1$, and controlled by spring $h^2$, all as before specified. The jaw $h^1$ is guided by an adjustable lug, $h^7$, secured to the ways, and is tethered by a chain or equivalent device, $h^6$, adjustably attached to the pendant or ways, as at $h^5$. The jaw $j$ is provided with a bent cam-rod, $h^8$, which is operated by a pin or lug, $h^9$, secured to or formed on the ways. When the rod $h$ is reciprocated by cam $m$ on shaft M the devices rise vertically for a determinate distance, with the jaws $h^1$ and $j$ separated, the jaw $j$ entering the loop of the thread and separating the strands. When the projection of bent cam-rod $h^8$ strikes pin $h^9$ the jaw $j$ is carried or forced over against $h^1$ with a griping motion, seizing the thread; and when the devices continue to advance, the pivoted jaws being tethered by chain $h^6$, they are compelled to swing around or move in the arc of a circle, thus carrying the thread across the path of the needle.

If, from any cause, it is found that there is too much friction between the slack-carrier and thread, an anti-friction roller or wheel, $o^5$, Fig. 9, may be employed.

While many markets demand brooms having the straight seams, in other markets curved-seamed brooms are desired; and in order that the latter may be formed when required, I have shown in Fig. 12 a modified arrangement of vise for sewing such seams. In said figure the vise is formed with two jaws, pivoted together and set by cams, as before specified, and is also provided with the adjustable concave rest for the shoulder of the broom; but instead of being formed to slide directly on the ways D, the vise is set in slides $s^4$, secured to a carrier-block, which moves on the ways D, and to said carrier-block $E^2$ the feed is applied. The vise is thus free to rise and fall vertically, and in order to control its motion a curved cam-bar, $n^1$, preferably provided with an anti-friction roll, $n^2$, is secured to the bottom of the vise, and travels on a camway, $D'$, underneath the ways D. The top of the vise is curved or rounded, as shown at $m^2$. Now, as the vise is fed along, it is free to gradually rise and fall, as actuated by the camway $D'$, and, as it commences at the point of highest elevation, and gradually sinks to $z'$, the lowest elevation, and again rises to $z$, where it is also at the highest elevation, the seam must be formed on the broom in curve reverse to the curve of the camway $D'$; consequently any curve desired may be obtained by varying the camway.

The advantages of my invention are that brooms can be sewed with great rapidity, with substantially the stitch made in hand-sewing, and in a much better and firmer manner, and with closer stitches than in hand-sewing; the machinery is durable, simple, and not liable to get out of repair; and but a small expenditure of power is required to run the machine.

I am aware that two reciprocating needles, acting alternately upon a single thread, have been employed in combination with thread-guides and a cloth-holder, and do not herein claim such subject-matter, for in such case the needles passed through the thread-guides, so that a tension capable of holding a thread against the spring or expansion of broom-corn while sewing the broom could not be obtained without injury to the needle, which would have to pass through the guide to reach the article to be sewed.

Having thus described the nature and advantages of my invention, what I claim, and desire to secure by Letters Patent, is—

1. In a broom-sewing machine, the combination of two hooked needles geared to act alternately upon a single thread, in combination with mechanism, substantially as described, adapted to advance after the passage of the needle and take its thread, move it laterally, and hold it taut across the path of the other needle, substantially as specified.

2. The hooked needles geared to act alternately upon a single thread, in combination with mechanism, substantially as described, adapted to advance after the passage of the needle and take its thread, move it laterally, and hold it taut across the path of the other needle, and slack-carriers adapted to advance and retire across the path of the needle to control the free end of the thread, substantially as specified.

3. The hooked needles adapted to operate alternately upon a single thread, in combination with mechanism, substantially as described, adapted to advance after the passage of the needle, take its thread and hold it taut across the path of the other needle, the slack-carriers adapted to advance and retire across the paths of the needles to control the free end or slack of the thread, and a movable or traveling vise provided with an adjustable rest adapted to present the broom to the sewing mechanism, substantially as and for the purpose specified.

4. A needle for sewing brooms and like articles, said needle having the double tapered or swelled and curved barb and the guard-swell, substantially as and for the purpose specified.

5. The needle for sewing brooms and like articles, having the double tapered or swelled and curved barb, the groove on the side of the barb, and the guard-swell, substantially as and for the purpose specified.

6. In a machine of the class specified, the combination, with a broom holding vise, of two hooked needles set sloping, so as to pass under and over the binder when in operation, substantially as specified.

7. In a machine of the class specified, the independent binder support or clamp arranged above the vise and adapted to sustain the binder, in combination with the movable or traveling vise, substantially as specified.

8. In a machine of the class specified, the tension devices composed of the reciprocating bar, the spring-jaws, and mechanism, substantially as described, to deflect the pivoted jaws or cause them to vibrate, substantially as and for the purpose specified.

In testimony whereof I, the said GEORGE F. McCOMBS, have hereunto set my hand.

GEORGE F. McCOMBS.

Witnesses:
F. W. RITTER, Jr.,
R. H. WHITTLESEY.